United States Patent
Dehais

(10) Patent No.: US 10,844,963 B2
(45) Date of Patent: Nov. 24, 2020

(54) SHOULDERED SHAFT WITH SPHERICAL THRUST SEAT

(71) Applicant: Hamilton Sundstrand Corporation, Charlotte, NC (US)

(72) Inventor: John M. Dehais, Windsor, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 79 days.

(21) Appl. No.: 16/030,486

(22) Filed: Jul. 9, 2018

(65) Prior Publication Data

US 2020/0011427 A1    Jan. 9, 2020

(51) Int. Cl.
| | |
|---|---|
| *F16K 1/22* | (2006.01) |
| *F16K 1/20* | (2006.01) |
| *F16C 19/10* | (2006.01) |

(52) U.S. Cl.
CPC .............. *F16K 1/225* (2013.01); *F16C 19/10* (2013.01); *F16K 1/2028* (2013.01); *F16K 1/224* (2013.01); *F16C 2361/91* (2013.01); *F16K 1/2035* (2013.01)

(58) Field of Classification Search
CPC . F16K 1/18; F16K 1/20; F16K 1/2028; F16K 1/2035; F16K 1/22; F16K 1/224; F16K 1/225; F16C 21/005; F16C 23/0084
See application file for complete search history.

(56) References Cited

U.S. PATENT DOCUMENTS

| | | | | |
|---|---|---|---|---|
| 1,219,921 | A * | 3/1917 | Collins | ................... F16C 19/10 384/609 |
| 2,924,424 | A * | 2/1960 | Titterington | .............. F16K 1/22 251/305 |
| 3,510,101 | A * | 5/1970 | Burtis | ................... F16K 1/2007 251/228 |
| 4,037,887 | A * | 7/1977 | Germain | ................. F16C 23/04 384/193 |
| 5,630,571 | A * | 5/1997 | Kipp | ......................... F02D 9/06 251/214 |
| 6,318,898 | B1 * | 11/2001 | Ward | ...................... C23C 28/00 384/492 |
| 8,763,988 | B2 | 7/2014 | Dowd et al. | |
| 9,103,453 | B2 | 8/2015 | Arnold et al. | |
| 9,470,328 | B2 | 10/2016 | Smith et al. | |

(Continued)

FOREIGN PATENT DOCUMENTS

| | | |
|---|---|---|
| DE | 3707904 A1 | 9/1988 |
| FR | 402799 A * | 10/1909 ............ F16C 23/086 |

(Continued)

OTHER PUBLICATIONS

Search Report dated Dec. 4, 2019, 8 pages.

*Primary Examiner* — Hailey K. Do
(74) *Attorney, Agent, or Firm* — Cantor Colburn LLP

(57) ABSTRACT

An intermediate thrust plate is provided to absorb thrust loads while permitting rotation and deflection of a butterfly valve shaft. The intermediate thrust plate includes a body having upper and lower surfaces and defining an aperture extending through the body between the upper and lower surfaces, the upper surface extending annularly about the aperture and being substantially flat, the lower surface extending annularly about the aperture and having a spherical shape and at least the lower surface including a low-friction material.

15 Claims, 3 Drawing Sheets

(56) References Cited

U.S. PATENT DOCUMENTS

| | | | |
|---|---|---|---|
| 2012/0199777 A1* | 8/2012 | Schlarman | F16K 1/224 251/305 |
| 2015/0060707 A1* | 3/2015 | Baasch | F15B 15/12 251/59 |
| 2015/0315984 A1 | 11/2015 | Hemsing et al. | |

FOREIGN PATENT DOCUMENTS

| | | | | |
|---|---|---|---|---|
| GB | 910640 A | * | 11/1962 | F16K 5/0647 |
| GB | 2542551 A | | 3/2017 | |
| JP | 2001108115 A | | 4/2001 | |
| JP | 4271905 | | 6/2009 | |
| WO | WO-2017182233 A1 | * | 10/2017 | F16K 1/2028 |

* cited by examiner

SHOULDERED SHAFT WITH SPHERICAL THRUST SEAT

BACKGROUND

The following description relates to butterfly valves and, more specifically, to a shouldered shaft with a spherical thrust seat to react to thrust loads for a butterfly shaft.

Typically, butterfly valves will react to shaft thrust loads using a spherical radius on the end of the shaft and a thrust plate of high wear resistant material abutting against the radius on the end of the shaft. This allows for rotation of the shaft and low torque due to the point contact created between the shaft and the thrust plate. If the shaft must be designed to extend outside of its housing, a shouldered shaft can be used, but the torque loads increase and the potential for binding correspondingly increases if shaft deflections are high.

That is, when the shouldered shaft is used, the shoulder on the shaft reacts to downward thrust loads, but high differential pressures across the disc on engine bleed valves can cause the shaft to deflect. When the shaft deflects, the shoulder is susceptible to binding because the desired clearances are low. This can greatly increase the friction loading and lead to the bind issue.

BRIEF DESCRIPTION

According to an aspect of the present disclosure, an intermediate thrust plate is provided to absorb thrust loads while permitting rotation and deflection of a butterfly valve shaft. The intermediate thrust plate includes a body having upper and lower surfaces and defining an aperture extending through the body between the upper and lower surfaces, the upper surface extending annularly about the aperture and being substantially flat, the lower surface extending annularly about the aperture and having a spherical shape and at least the lower surface includes a low-friction material.

In accordance with additional or alternative embodiments, the body includes the low-friction material.

In accordance with additional or alternative embodiments, the body is integrally coupled to a shoulder of a butterfly valve shaft.

According to an aspect of the present disclosure, a thrust assembly of a butterfly valve is provided. The thrust assembly includes an upper thrust plate securable about a shaft, a lower thrust plate securable about the shaft, the upper and lower thrust plates being disposable to cooperatively define a cavity in which a shoulder of the shaft is disposable, and an intermediate thrust plate interposable between the shoulder and the lower thrust plate. The lower and intermediate thrust plates include spherical upper and lower surfaces, respectively, which are seated together for permitting rotation and deflection of the shaft.

In accordance with additional or alternative embodiments, the thrust assembly further includes a lever for actuating a butterfly valve disc.

In accordance with additional or alternative embodiments, the cavity has a diameter that exceeds a diameter of the shoulder.

In accordance with additional or alternative embodiments, the upper and lower thrust plates are formed to define upper and lower apertures, respectively, the upper and lower apertures being communicative with the cavity and having respective diameters that exceed a diameter of the shaft.

In accordance with additional or alternative embodiments, a lower surface of the shoulder and an upper surface of the intermediate plate are substantially flat.

In accordance with additional or alternative embodiments, at least one of the upper surface of the lower thrust plate and the lower surface of the intermediate thrust plate includes a low-friction coating.

In accordance with additional or alternative embodiments, at least one of the upper surface of the lower thrust plate and the lower surface of the intermediate thrust plate includes low-friction plating.

In accordance with additional or alternative embodiments, ball bearings are interposed between the upper surface of the lower thrust plate and the lower surface of the intermediate thrust plate.

According to an aspect of the present disclosure, a butterfly valve is provided and includes a housing including a thrust assembly and defining a pathway through which fluid flows, a butterfly valve disc, which interacts with the fluid in the pathway, a shaft coupled to the butterfly valve disc and including a shoulder, which is rotatably supported in the thrust assembly. The thrust assembly includes upper and lower thrust plates secured to the housing and about the shaft to cooperatively define a cavity in which the shoulder is disposable and an intermediate thrust plate, which is interposed between the shoulder and the lower thrust plate, the lower and intermediate thrust plates including spherical upper and lower surfaces, respectively, which are seated together for permitting rotation and deflection of the shaft.

In accordance with additional or alternative embodiments, the thrust assembly includes a lever for actuating the butterfly valve disc.

In accordance with additional or alternative embodiments, the cavity has a diameter that exceeds a diameter of the shoulder.

In accordance with additional or alternative embodiments, the upper and lower thrust plates are formed to define upper and lower apertures, respectively, the upper and lower apertures being communicative with the cavity and having respective diameters that exceed a diameter of the shaft.

In accordance with additional or alternative embodiments, the upper thrust plate includes a piston seal and a shim between the piston seal and a lower portion of the housing.

In accordance with additional or alternative embodiments, a lower surface of the shoulder and an upper surface of the intermediate plate are substantially flat.

In accordance with additional or alternative embodiments, at least one of the upper surface of the lower thrust plate and the lower surface of the intermediate thrust plate includes a low-friction coating.

In accordance with additional or alternative embodiments, at least one of the upper surface of the lower thrust plate and the lower surface of the intermediate thrust plate includes low-friction plating.

In accordance with additional or alternative embodiments, ball bearings are interposed between the upper surface of the lower thrust plate and the lower surface of the intermediate thrust plate.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a butterfly valve is provided with a spherical shaft seat. The butterfly valve shaft is thus allowed to deflect and rotate at the same time, since the spherical shaft seat will self-align in the spherical radius of the thrust plate.

Figure 2:
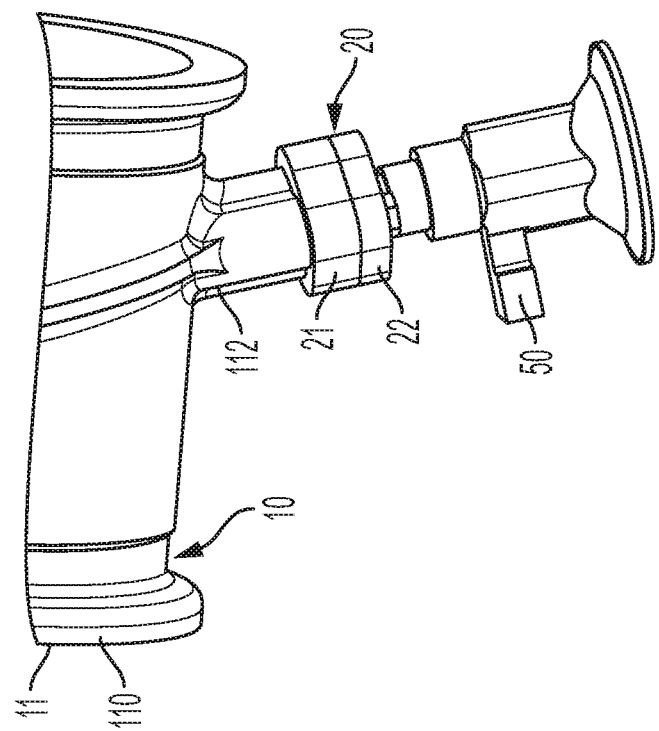
FIG. 2 is a perspective view of a thrust assembly of the butterfly valve assembly of FIG. 1
Figure 1:
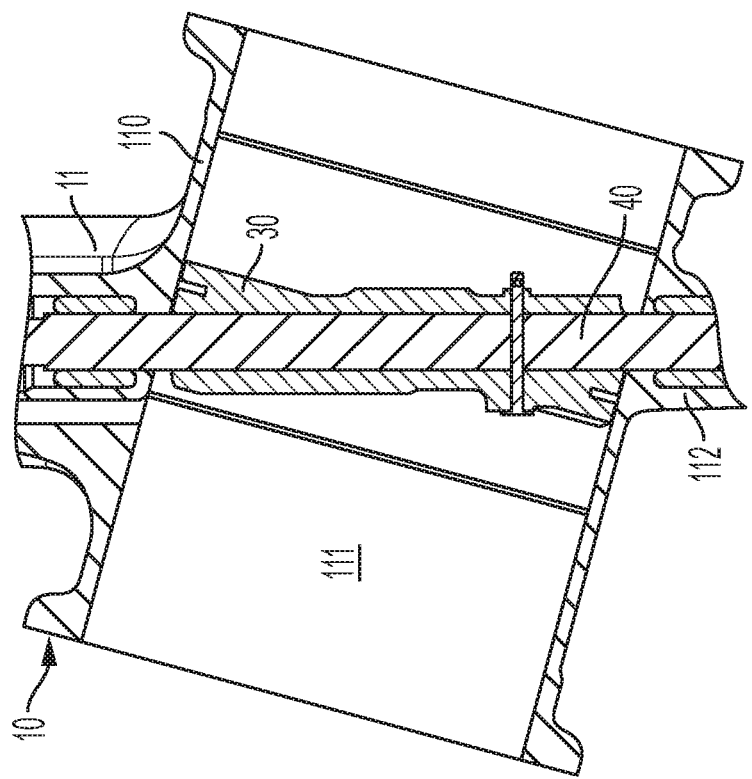
FIG. 1 is a side cutaway view of a butterfly valve assembly in accordance with embodiments.

With reference to FIGS. 1 and 2, a butterfly valve assembly 10 is provided. The butterfly valve assembly 10 includes a housing 11. The housing 11 includes an upper portion 110 that is formed to define a pathway 111 through which fluid flows and a lower portion 112 integrally coupled to the upper portion 110. The butterfly valve assembly 10 further includes a thrust assembly 20, a butterfly valve disc 30, which interacts with the fluid in the pathway 111, and a shaft 40. The shaft 40 is coupled to the butterfly valve disc 30 and includes a shoulder 41 (see FIG. 3). The shoulder 41 is rotatably supported in the thrust assembly 20. The thrust assembly 20 includes an upper thrust plate 21, a lower thrust plate 22 and an intermediate thrust plate 23 (see FIG. 3). The upper and lower thrust plates 21 and 22 are securable to the lower portion 112 to form a fixed structure and are securable about the shaft 40 to cooperatively define a cavity 24 (see FIG. 3) in which the shoulder 41 is disposable. The cavity 24 has a larger diameter than the shoulder 41 such that the shoulder 41 is permitted to rotate and to deflect within the cavity 24.

Figure 3:
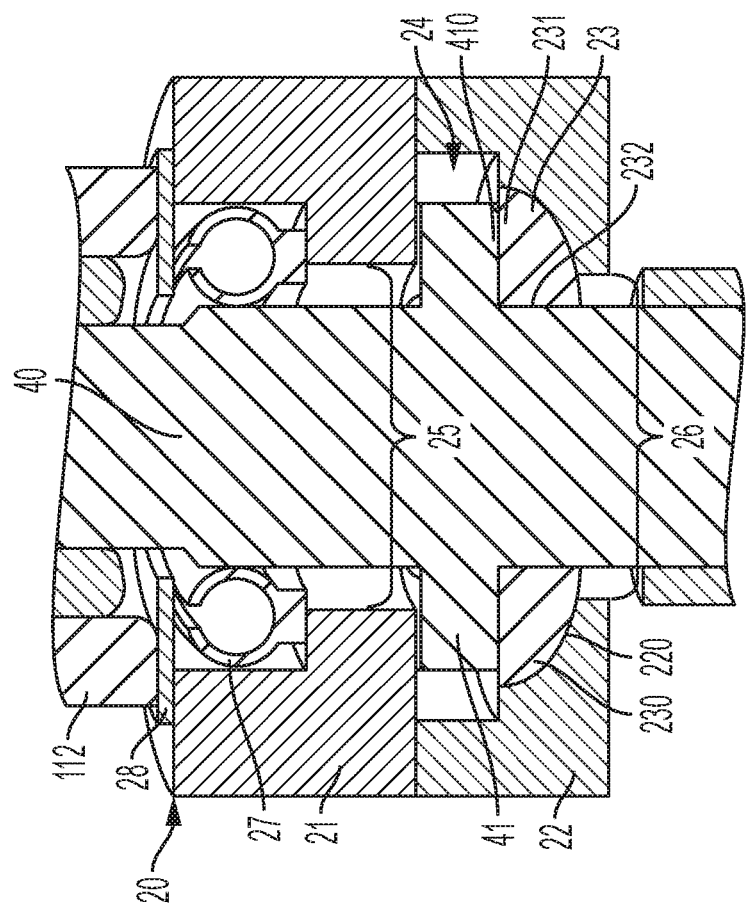
FIG. 3 is a side cutaway view of the thrust assembly of FIG. 2 in accordance with embodiments.

With reference to FIG. 3, the upper thrust plate 21 is formed to define an aperture 25 that has a larger diameter than the shaft 40 and is communicative with the cavity 24 and the lower thrust plate 22 is formed to define an aperture 26 that has a larger diameter that the shaft 40 and is communicative with the cavity 24. The communication of the apertures 25 and 26 with the cavity 24 allows the shaft 40 to extend through the apertures 25 and 26 to the shoulder 41 in the cavity 24. The upper thrust plate 21 further includes a piston seal 27, which is interposable between an upper portion of the upper thrust plate 21 and the shaft 40, and a shim 28 that holds the piston seal 27 in place.

The upper thrust plate 21 and the lower thrust plate 22 are respectively formed to extend about the apertures 25 and 26. The upper thrust plate 21 and the lower thrust plate 22 are affixable together about the shaft 40 and the shoulder 41 with the intermediate thrust plate 23 being interposable between the shoulder 41 and the lower thrust plate 22. The lower thrust plate 22 includes an upper surface 220, the intermediate thrust plate 23 includes a lower surface 230, an upper surface 231 and an interior surface 232, which is tightly fit about the shaft 40, and the shoulder 41 includes a lower surface 410. The lower surface 410 and the upper surface 231 may be but are not required to be flat and are seated together with flush contact. The upper surface 220 and the lower surface 230 may be spherical and may be seated together with flush contact for permitting rotation and deflection of the shaft 40. That is, as the shaft 40 rotates and deflects, the spherical lower surface 230 rides along the spherical upper surface 220.

During an operation of the butterfly valve assembly 10, fluid flow along the pathway 111 is affected by the butterfly valve disc 30. When the butterfly valve disc 30 is in its open position, the fluid flow is permitted to flow around the profile of the butterfly valve disc 30 towards an outlet with little pressure drop. When the butterfly valve disc 30 is in the partially or fully closed positions, the butterfly valve disc occupies some or a substantial flow area of the pathway 111 and thus blocks some or a substantial portion of the fluid flow. Actuation of the butterfly valve disc 30 can be achieved through a rotation of the shaft 40 automatically or manually using a lever 50 of the thrust assembly 20.

In any case, fluid interactions with the butterfly valve disc 30 tend to exert thrust loads that are directed downwardly through the shaft 40 to the thrust assembly 20. The thrust assembly 20 is configured to react to these loads to permit rotation of the shaft 40 even while the shaft 40 is deflected.

The ability of the thrust assembly 20 to react to the loads to permit the rotation of the shaft 40 even while the shaft 40 is deflected will now be described. When the shaft 40 is not deflected, the thrust assembly 20 reacts to downwardly directed thrust loads along the longitudinal axis of the shaft 40. Conversely, when the shaft 40 is deflected, the intermediate thrust plate 23 deflects along with the shoulder 41 while the piston seal 27 is compressed between the shaft 40 and a side of the upper thrust plate 21 (the large diameters of the apertures 25 and 26 provide room for the deflection of the shaft 40). The deflection of the intermediate thrust plate 23 along with the shoulder 41 is permitted or otherwise facilitated by the respective spherical shapes of the upper surface 220 and the lower surface 230.

Figure 5:
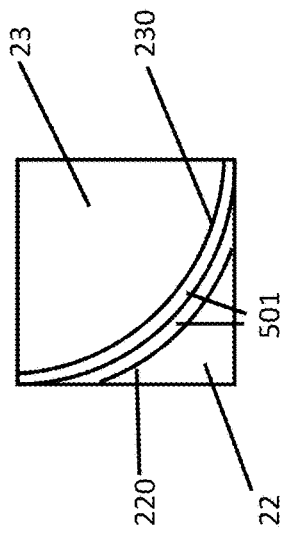
FIG. 5 is a schematic view of plating of the thrust assembly of FIG. 3 in accordance with embodiments.
Figure 4:
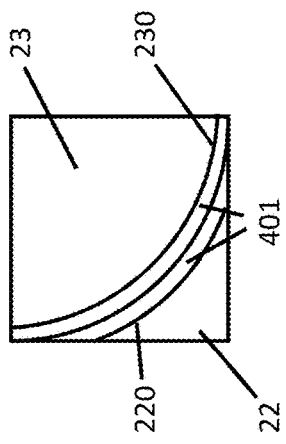
FIG. 4 is a schematic view of a coating of the thrust assembly of FIG. 3 in accordance with embodiments.

With reference to FIGS. 4 and 5 and, in accordance with embodiments, at least the upper surface 220 and the lower surface 230 may include a low-friction coating 401 (see FIG. 4), such as Teflon™, or a low friction plating 501 (see FIG. 5).

Figure 6:
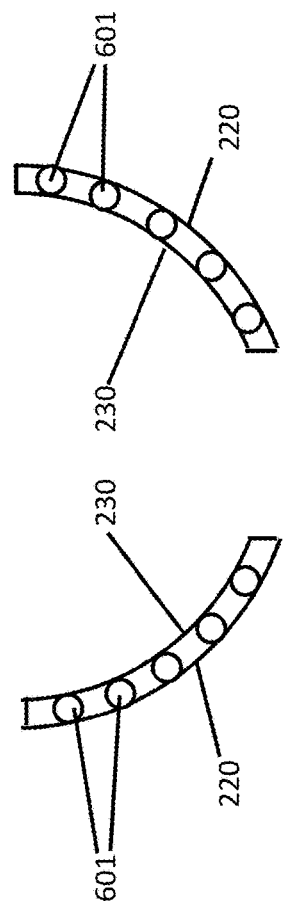
FIG. 6 is a schematic illustration of ball bearing interposed between intermediate and lower plates of the thrust assembly of FIG. 3.

With reference to FIG. 6 and, in accordance with further embodiments, the thrust assembly 20 may include one or more ball bearings 601 that are secured to either the upper surface 220 or the lower surface 230 and are thus interposed between the upper surface 220 and the lower surface 230.

Technical effects and benefits of the present disclosure are that the shaft can protrude from the end of the housing to provide position indication or wrenching provisions and the shaft can react to relatively high loads in applications where shaft deflections are high. In addition, material selections for wear and contact stress can be dictated by temperature and vibration requirements.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A thrust assembly of a butterfly valve comprising a shaft and a shoulder extending radially outwardly from the shaft, the thrust assembly comprising:
   an upper thrust plate securable about the shaft;
   a lower thrust plate securable about the shaft,
   the upper and lower thrust plates being disposable to cooperatively define a cavity in which the shoulder of the shaft is disposable; and
   an intermediate thrust plate interposable between the shoulder and the lower thrust plate,
   the lower and intermediate thrust plates comprising spherical upper and lower surfaces, respectively, which are seated together for permitting rotation and deflection of the shaft, and the intermediate thrust plate comprising an interior surface that is tightly fittable about the shaft.

2. The thrust assembly according to claim 1, further comprising a lever for actuating a butterfly valve disc.

3. The thrust assembly according to claim 1, wherein the cavity has a diameter that exceeds a diameter of the shoulder.

4. The thrust assembly according to claim 1, wherein:
   the upper and lower thrust plates are formed to define upper and lower apertures, respectively,
   the upper and lower apertures being communicative with the cavity and having respective diameters that exceed a diameter of the shaft.

5. The thrust assembly according to claim 1, wherein a lower surface of the shoulder and an upper surface of the intermediate plate are substantially flat.

6. The thrust assembly according to claim 1, wherein at least one of the upper surface of the lower thrust plate and the lower surface of the intermediate thrust plate comprises Teflon™.

7. The thrust assembly according to claim 1, further comprising ball bearings interposed between the upper surface of the lower thrust plate and the lower surface of the intermediate thrust plate, the ball bearings being secured to either the upper surface of the lower thrust plate or the lower surface of the intermediate thrust plate.

8. A butterfly valve, comprising:
   a housing comprising a thrust assembly and defining a pathway through which fluid flows;
   a butterfly valve disc, which interacts with the fluid in the pathway;
   a shaft coupled to the butterfly valve disc and comprising a shaft portion and a shoulder, which is rotatably supported in the thrust assembly, the shoulder being integrally connected with and extending radially outwardly from the shaft portion,
   the thrust assembly comprising:
   upper and lower thrust plates secured to the housing and about the shaft portion to cooperatively define a cavity in which the shoulder is disposable; and
   an intermediate thrust plate, which is interposed between the shoulder and the lower thrust plate,
   the lower and intermediate thrust plates comprising spherical upper and lower surfaces, respectively, which are seated together for permitting rotation and deflection of the shaft, and the intermediate thrust plate comprising an interior surface that is tightly fittable about the shaft.

9. The butterfly valve according to claim 8, wherein the thrust assembly comprises a lever for actuating the butterfly valve disc.

10. The butterfly valve according to claim 8, wherein the cavity has a diameter that exceeds a diameter of the shoulder.

11. The butterfly valve according to claim 8, wherein:
    the upper and lower thrust plates are formed to define upper and lower apertures, respectively,
    the upper and lower apertures being communicative with the cavity and having respective diameters that exceed a diameter of the shaft.

12. The butterfly valve according to claim 8, wherein the upper thrust plate comprises a piston seal and a shim between the piston seal and a lower portion of the housing.

13. The butterfly valve according to claim 8, wherein a lower surface of the shoulder and an upper surface of the intermediate plate are substantially flat.

14. The butterfly valve according to claim 8, wherein at least one of the upper surface of the lower thrust plate and the lower surface of the intermediate thrust plate comprises Teflon™.

15. The butterfly valve according to claim 8, further comprising ball bearings interposed between the upper surface of the lower thrust plate and the lower surface of the intermediate thrust plate, the ball bearings being secured to either the upper surface of the lower thrust plate or the lower surface of the intermediate thrust plate.

* * * * *